US012043087B2

(12) United States Patent
Yeon et al.

(10) Patent No.: US 12,043,087 B2
(45) Date of Patent: Jul. 23, 2024

(54) APPARATUS AND METHOD FOR CLEANING AIR

(71) Applicants: HYUNDAI MOTOR COMPANY, Seoul (KR); KIA MOTORS CORPORATION, Seoul (KR); Hanon Systems, Daejeon (KR)

(72) Inventors: Dong-Won Yeon, Daejeon (KR); Myung-Jun Kim, Busan (KR); Ei-Hyun Choi, Daejeon (KR); Han-Joo Lee, Daejeon (KR); Jun-Ho Choi, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 311 days.

(21) Appl. No.: 16/664,240

(22) Filed: Oct. 25, 2019

(65) Prior Publication Data

US 2020/0171918 A1 Jun. 4, 2020

(30) Foreign Application Priority Data

Dec. 3, 2018 (KR) .................. 10-2018-0153512

(51) Int. Cl.
  *B60H 1/00* (2006.01)
  *B60H 3/06* (2006.01)

(52) U.S. Cl.
  CPC ..... *B60H 1/00964* (2013.01); *B60H 1/00785* (2013.01); *B60H 1/008* (2013.01); *B60H 3/0608* (2013.01)

(58) Field of Classification Search
None
See application file for complete search history.

(56) References Cited

U.S. PATENT DOCUMENTS

| 10,343,495 | B2 | 7/2019 | Lee et al. |
| 2015/0210140 | A1 | 7/2015 | Matsuoka et al. |
| 2015/0360544 | A1* | 12/2015 | Fruehsorger ............ F24F 3/16 96/19 |
| 2017/0113517 | A1 | 4/2017 | Kwon et al. |
| 2017/0166037 | A1* | 6/2017 | Lee ................. B60H 1/3207 |
| 2018/0281554 | A1* | 10/2018 | Duan ................ B60H 1/00771 |
| 2020/0180387 | A1* | 6/2020 | Sarma .............. B60H 1/00007 |

FOREIGN PATENT DOCUMENTS

| KR | 20-0300242 B | 12/2002 |
| KR | 10-2007-0005261 A | 1/2007 |
| KR | 10-2007-0103228 A | 10/2007 |
| KR | 20090094978 A * | 9/2009 ............ B60H 1/00 |

(Continued)

OTHER PUBLICATIONS

Machine translation of KR20090094978A (Year: 2024).*

*Primary Examiner* — Aniss Chad
*Assistant Examiner* — Jennifer M Anda
(74) *Attorney, Agent, or Firm* — Fox Rothschild LLP

(57) ABSTRACT

An apparatus for cleaning air may include conditioning equipment; an input unit which receives an air cleaning command operating the conditioning equipment; and a controller which executes an air cleaning control regardless of a turn on/off of the conditioning equipment according to the air cleaning command to operate the conditioning equipment.

17 Claims, 8 Drawing Sheets

(56) References Cited

FOREIGN PATENT DOCUMENTS

| KR | 20150021385 A | * | 3/2015 |
| --- | --- | --- | --- |
| KR | 10-2015-0096845 A | | 8/2015 |
| KR | 10-2016-0141611 A | | 12/2016 |
| KR | 10-2017-0048789 A | | 5/2017 |
| KR | 10-2017-0048789 A | | 5/2017 |
| KR | 10-2017-0071013 A | | 6/2017 |

* cited by examiner

APPARATUS AND METHOD FOR CLEANING AIR

CROSS-REFERENCE TO RELATED APPLICATION

The present application claims priority to and the benefit of Korean Patent Application No 10-2018-0153512 filed on Dec. 3, 2018, which is incorporated herein by reference in its entirety.

FIELD

The present disclosure relates to a technique for cleaning air, and more particularly, to an apparatus and method for cleaning air capable of cleaning air in a vehicle even in a state where conditioning equipment is turned off.

BACKGROUND

The statements in this section merely provide background information related to the present disclosure and may not constitute prior art.

In order to ventilate air inside a vehicle, a driver directly opens a window, a door, or the like. However, it is difficult to open the window, the door, or the like in rainy weather, and outside air is contaminated with particulate matters and various contaminants. Therefore, it is difficult to obtain a ventilation effect due to the inflow of particulate matters and contaminants into the vehicle.

On the other hand, the vehicle is equipped with conditioning equipment for keeping the interior of the vehicle comfortably, and the interior of the vehicle is ventilated by using the conditioning equipment. However, the indoor ventilation using the conditioning equipment is performed by an operation of a driver or a passenger. Therefore, the indoor ventilation is not performed until the driver or the passenger recognizes the indoor contamination of the vehicle, so there is a problem that it is difficult to actively cope with the situation where the air contamination concentration in the vehicle is increased.

To cope with such a problem, a technique of automatically controlling conditioning equipment using a sensor has been disclosed. In this case, however, there is a problem that the conditioning equipment is performed only when the conditioning equipment is kept in the turned on state.

In addition, since only the conditioning equipment is used, there is a problem that outside contaminants may inflow into a vehicle when a window, a sunroof, or the like is opened.

In addition, an indoor/outdoor unit control, a blower control, and an air conditioner control need to be unconditionally performed in sequence, which causes a problem that the fuel consumption deteriorates.

SUMMARY

The present disclosure provides an apparatus and method for cleaning air capable of cleaning air in a vehicle even in a state where conditioning equipment is turned off.

The present disclosure also provides an apparatus and method for cleaning air capable of cleaning air in a vehicle by interlocking the apparatus for cleaning air with a window, a sunroof, or the like.

The present disclosure also provides an apparatus and method for cleaning air capable of improving fuel efficiency by selectively performing an indoor/outdoor unit control, a blower control, an air conditioner control, and the like depending on a contamination concentration of indoor air.

The present disclosure provides an apparatus for cleaning air capable of cleaning air in a vehicle even in a state where the conditioning equipment is turned off.

The present disclosure provides the apparatus for cleaning air includes: conditioning equipment; an input unit which receives an air cleaning command operating the conditioning equipment; and a controller which executes an air cleaning control regardless of a turn on/off of the conditioning equipment according to the air cleaning command to operate the conditioning equipment.

The controller may release the air cleaning control by being interlocked with whether to open/close an opening/closing device.

The opening/closing device may be closed as the air cleaning command is input, and if the opening/closing device is not closed, the air cleaning control may be released after a preset waiting time lapses.

The apparatus for cleaning air may further include a sensor which measures a contamination concentration in a vehicle.

An indoor/outdoor unit control and a blower control which perform an outdoor air mode in which air outside a vehicle inflows and is circulated or an indoor air mode in which only air inside the vehicle is circulated by using the conditioning equipment depending on the contamination concentration may be performed.

If the contamination concentration is a preset reference value, an air conditioner on control which turns on the air conditioner of the conditioning equipment may be performed.

If humidity on a surface of a window of the vehicle is detected by the sensor, an air conditioner on control which turns on the air conditioner of the conditioning equipment may be performed.

The contamination concentration may be converted into a grade.

The contamination concentration may be converted into a concentration level.

The apparatus for cleaning air may further include an output unit which outputs the contamination concentration.

In some forms of the present disclosure, a method for cleaning air includes: receiving, by an input unit, an air cleaning command operating conditioning equipment; and executing, by a controller, an air cleaning control irrespective of a turn on/off of the conditioning equipment according to the air cleaning command to operate the conditioning equipment.

The method for cleaning air may further include measuring, by a sensor, a contamination concentration in a vehicle.

In some forms the present disclosure, even when the conditioning equipment is turned off, an air cleaning function can be performed by the user's choice.

In addition, in some forms of the present disclosure, the apparatus for cleaning air is interlocked with the open/close state of the window and the sunroof to perform the air cleaning function, thereby making it possible to efficiently perform the air cleaning.

In addition, in some forms of the present disclosure, the indoor/outdoor unit control, the blower control, and the air conditioner control are progressively and selectively performed depending on the indoor contamination concentration, so the fuel efficiency can be increased.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
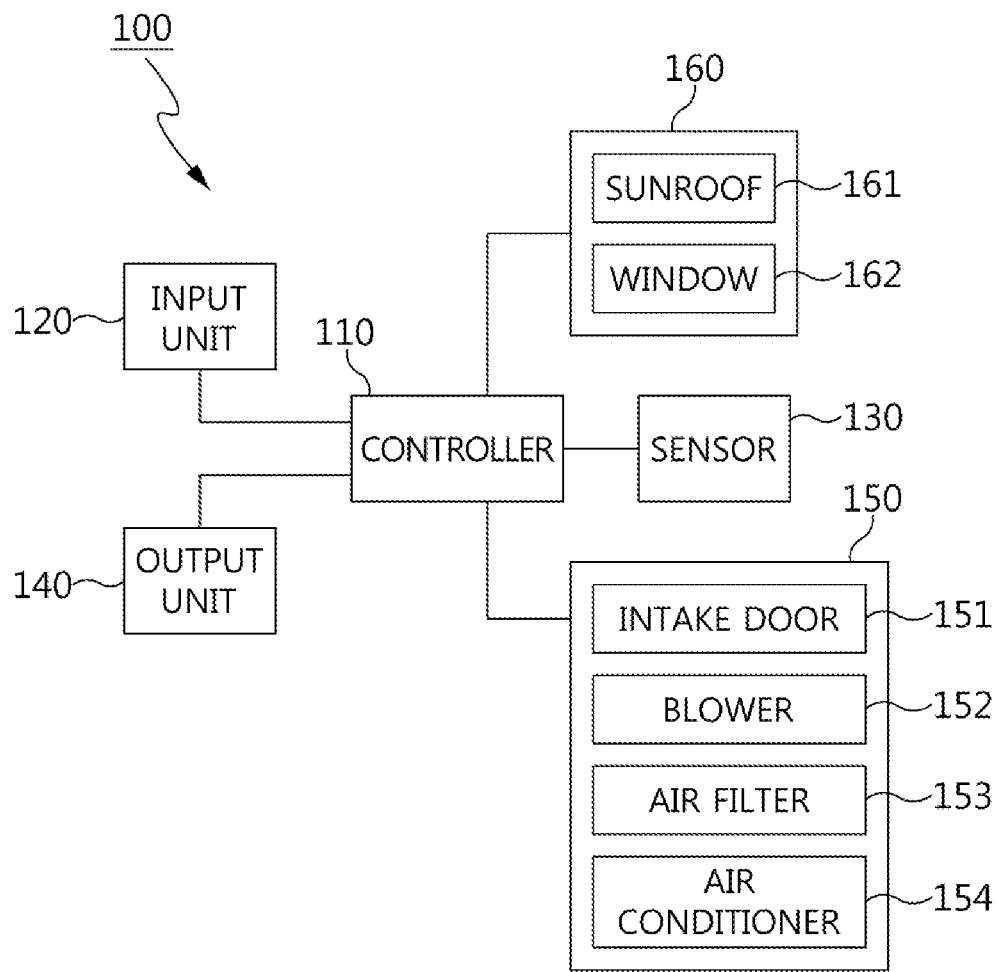
FIG. 1 is a block configuration diagram of an apparatus for cleaning air in one form of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the accompanying drawings, the same reference numerals will be used to describe the same components. Terms used in the specification, 'first', 'second', etc. can be used to describe various components, but the components are not to be construed as being limited to the terms. The terms are only used to differentiate one component from other components.

For example, the 'first' component may be named the 'second' component and the 'second' component may also be similarly named the 'first' component, without departing from the scope of the present disclosure. The term 'and/or' includes a combination of a plurality of items or any one of a plurality of terms.

Unless defined otherwise, it is to be understood that all the terms used in the specification including technical and scientific terms have the same meaning as those that are generally understood by those who skilled in the art to which the present disclosure pertains.

It must be understood that the terms generally used and defined by the dictionary are identical with the meanings within the context of the related art, and they should not be ideally or excessively formally defined unless the context clearly dictates otherwise in the specification.

Hereinafter, an apparatus and method for cleaning air in some forms of the present disclosure will be described with reference to the accompanying drawings.

FIG. 1 is a block configuration diagram of an apparatus 100 for cleaning air in some forms of the present disclosure. Referring to FIG. 1, the apparatus 100 for cleaning air may be configured to include a controller 110 that performs an air cleaning control, an input unit 120 that receives an air cleaning command for performing the air cleaning control, an output unit 140 that provides information to a user, conditioning equipment 150 that operates according to the air cleaning control, and the like. In addition, the apparatus 100 for cleaning air may be configured to include a sensor 130 for measuring an indoor contamination concentration in a vehicle, and an opening/closing device 160 for user's entry/exit and ventilation.

The controller 110 is connected to components constituting the vehicle to perform a control, and transmits and receives data and signals. In particular, when the controller 110 receives an air cleaning command for operating the conditioning equipment 150 through the input unit 120, the controller 110 performs the air cleaning control regardless of a turn on/off state of the conditioning equipment 150 to operate the conditioning equipment 150.

The input unit 120 serves to receive a user command. At this time, the command may be an operation, voice, touch, or the like. Accordingly, the input unit 120 may be an operation button key, a touch screen, a microphone, and a combination thereof.

The sensor 130 performs a function of measuring the indoor contamination concentration in the vehicle. Accordingly, the sensor 130 may be a particulate matters sensor that can measure a particulate matters concentration in a vehicle, a carbon dioxide sensor that detects a carbon dioxide concentration, a humidity sensor that detects humidity, a temperature sensor that senses temperature, an auto defog sensor (ADS) that senses moisture on a surface of a window, and the like. Alternatively, the sensor 130 may be configured in a combination of the above-mentioned sensors.

The output unit 140 provides an indoor contamination level, an information screen for a user, a menu screen, and the like. In order to provide such information, the output unit 140 may be a liquid crystal display (LCD), a light emitting diode (LED) display, an organic LED (OLED) display, a touch screen, a flexible display, a head up display (HUD), speaker, and the like, and a combination thereof. Therefore, the information can be provided by voice, graphic, and a combination thereof.

The conditioning equipment 150 is provided with an intake door 151 for selecting outside air and inside air inflowing into a duct (not shown). An outdoor air mode and an indoor air mode are selectively switched by opening/closing an inlet (not shown) for outdoor air and indoor air of the duct through the intake door 151, and in the outdoor air mode, air outside a vehicle inflows and circulates into a vehicle by a blower 152. On the other hand, in the indoor air mode, the inflow of outside air from the vehicle is blocked and only the air in the vehicle is circulated by the blower 152.

In addition, the conditioning equipment 150 is provided with an air filter 153 for removing foreign matters in the air inside the duct for air inflow and an air conditioner 154. The air filter 153 filters and passes foreign matters such as particulate matters in the air flowing into the duct by a running wind or at the time of operating the blower 152.

The opening/closing device 160 includes a sunroof 161, a window 162 of a vehicle door, and the like. Generally, the sunroof (not shown) is connected to a motor via a cable (not shown). Accordingly, the sunroof linearly moves along a rail (not shown) by a forward rotation or a reverse rotation of the motor. This linear motion causes the sunroof to be in a "close" or "open" state. The window 162 also has a similar structure thereto.

Figure 2:
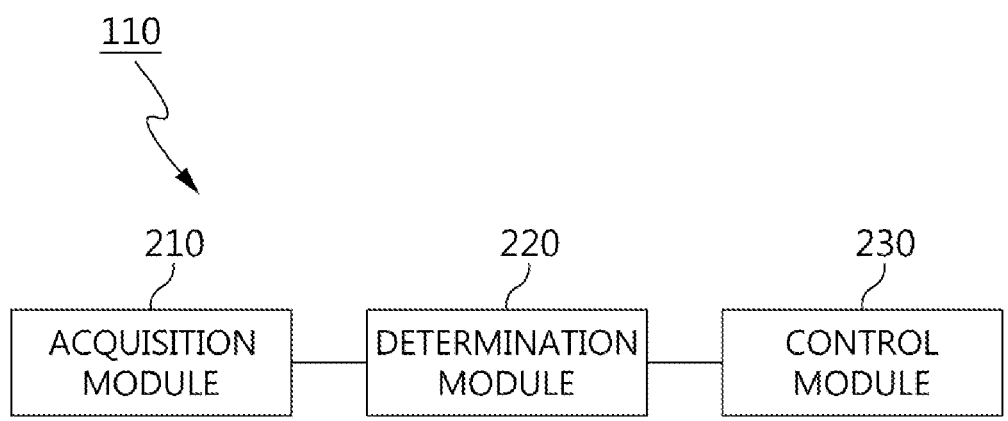
FIG. 2 is a detailed block configuration diagram of a controller shown in FIG. 1.

FIG. 2 is a detailed block configuration diagram of the controller 110 shown in FIG. 1. Referring to FIG. 2, the controller 110 is configured to include an acquisition module 210 which acquires and processes an air cleaning command, contamination concentration information, and the like, a determination module 220 which evaluates a grade of air quality depending on the contamination concentration information and determines whether to operate the conditioning equipment depending on the evaluated grade, a control module 230 which performs the air cleaning control according to the determined result, and the like.

The term "module" shown in FIG. 2 means a unit of processing at least one function or operation, which may be implemented by hardware or software or a combination of hardware and software. The hardware may be implemented as an application specific integrated circuit (ASIC), digital signal processing (DSP), a programmable logic device (PLD), a field programmable gate array (FPGA), a processor, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

Figure 3:
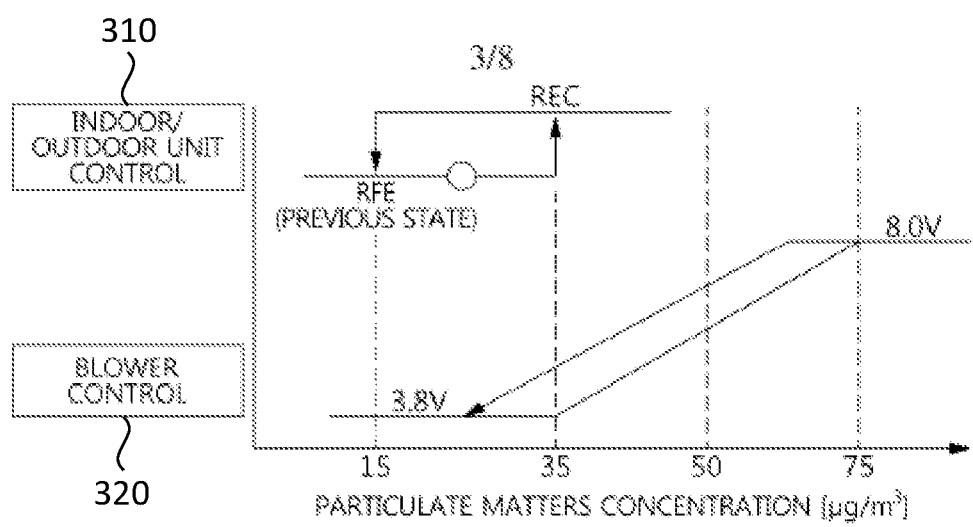
FIG. 3 is a graph for describing decontamination logic depending on an indoor contamination concentration in a vehicle in one form of the present disclosure.

FIG. 3 is a graph for describing decontamination logic depending on an indoor contamination concentration in a vehicle in some forms of the present disclosure. Referring to FIG. 3, the decontamination logic includes an indoor/outdoor unit control 310 and a blower control 320. The indoor/outdoor unit control 310 is switched between an outdoor air mode (FRE: FREeze) and an indoor air mode (REC: RECirculation) depending on the contamination concentration. The outdoor air mode (FRE) is a previous state, and air outside a vehicle inflows into a vehicle by the blower 152 and circulated. In the indoor air mode (REC), the inflow of the outside air from the vehicle is blocked and only the air in the vehicle is circulated by the blower 152.

In other words, the indoor air is switched depending on the indoor contamination concentration in the vehicle, and the voltage of the blower 152 is increased.

Figure 4:
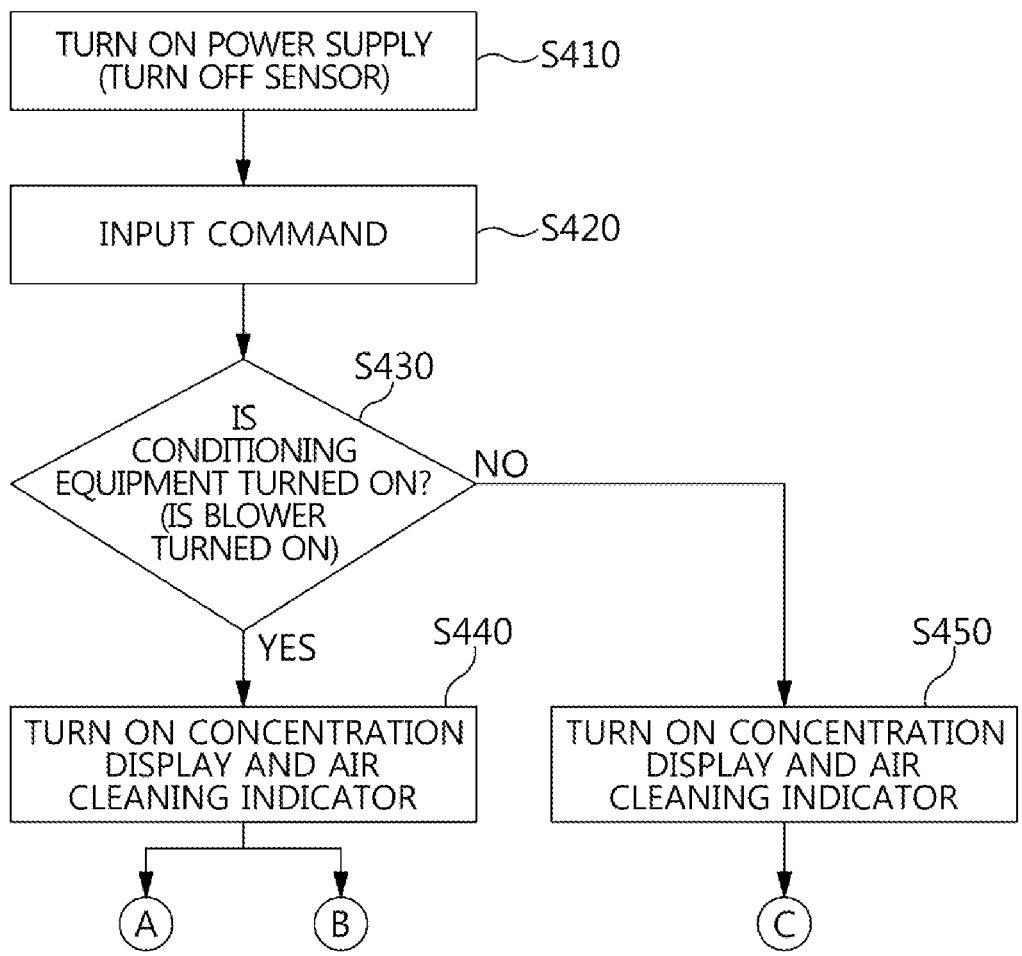
FIG. 4 is a flowchart showing a process of controlling air cleaning in one form of the present disclosure.

FIG. 4 is a flowchart showing a process of controlling air cleaning in some forms of the present disclosure. Referring to FIG. 4, as a power supply for a vehicle is turned on, the controller (110 in FIG. 1) is in a turned on state and the sensor is in a turned off state (step S410). Thereafter, the user inputs the air cleaning command to operate the conditioning equipment (150 in FIG. 1) (step S420).

As the air cleaning command is input, the controller 110 confirms whether the conditioning equipment 150 is in the turned on state (step S430).

According to the determination result in step S430, when the conditioning equipment is in the turned on state, the output unit 140 outputs a turn on of a concentration display and an air cleaning indicator (step S440). Similarly, even if the conditioning equipment is in the turned off state, the output unit 140 outputs the turn on of the concentration display and the air cleaning indicator (step S450). In other words, it means that the air cleaning control is performed regardless of the turn on/off of the conditioning equipment.

Figure 5:
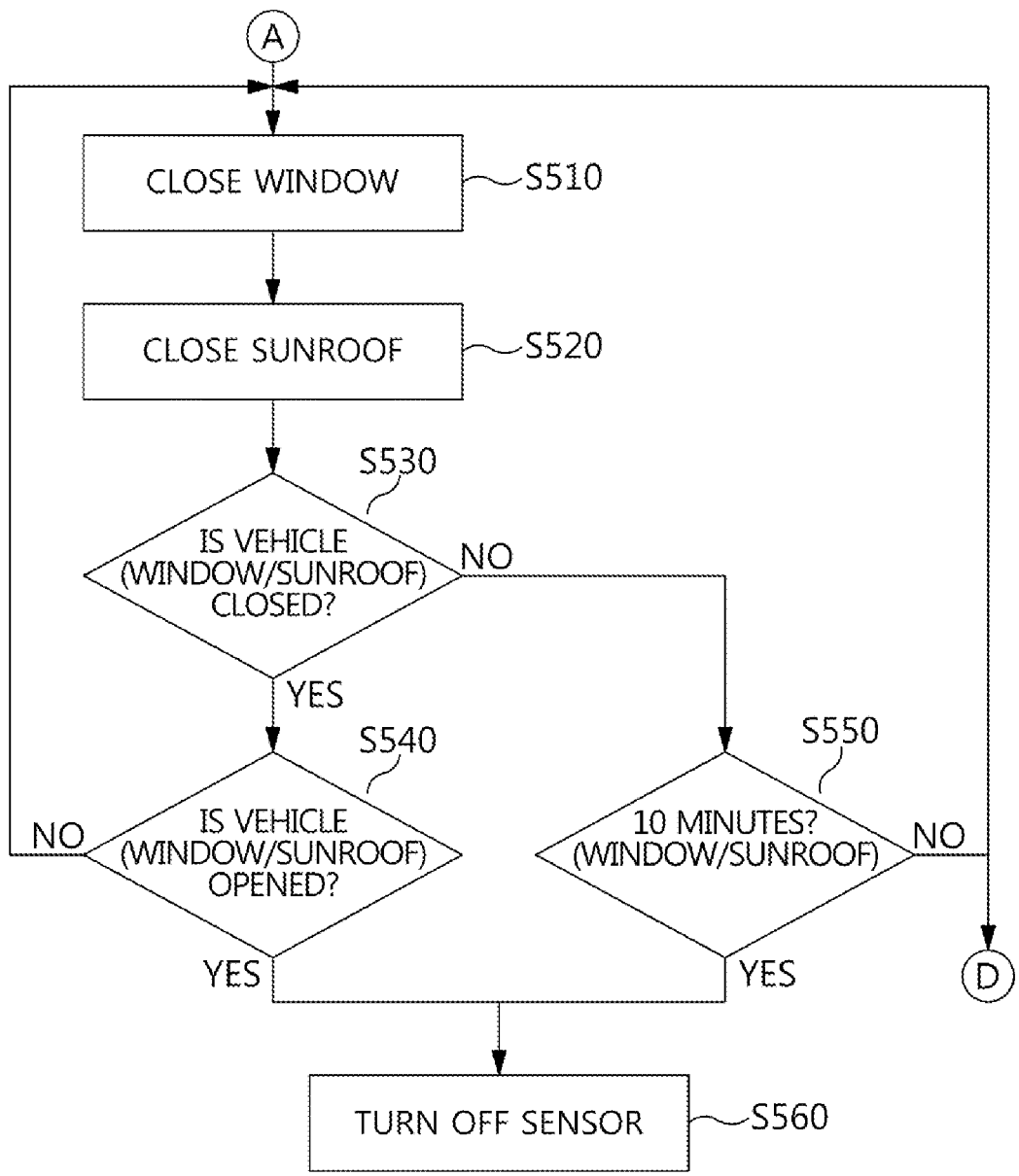
FIG. 5 is a flowchart showing a process of controlling an opening/closing of a window and a sunroof.

FIG. 5 is a flowchart showing a process of controlling an opening/closing of a window and a sunroof. Referring to FIG. 5, as the air cleaning command is input, the controller 110 closes the window 162 (step S510) and the sunroof 161 (step S520) to block the inflow of contaminants from the outside of the vehicle, and performs the air cleaning function.

If the window 162 and/or the sunroof 161 are not closed while the air cleaning function is performed, the air cleaning control is released and the sensor 130 is also turned off after waiting for 10 minutes (steps S530, S550, and S560).

On the other hand, when the window/sunroof is closed and then opened, the air cleaning control is released and the sensor is also turned off (steps S530, S540, and S560). In other words, this is the case where the user opens a window to smoke.

Figure 6:
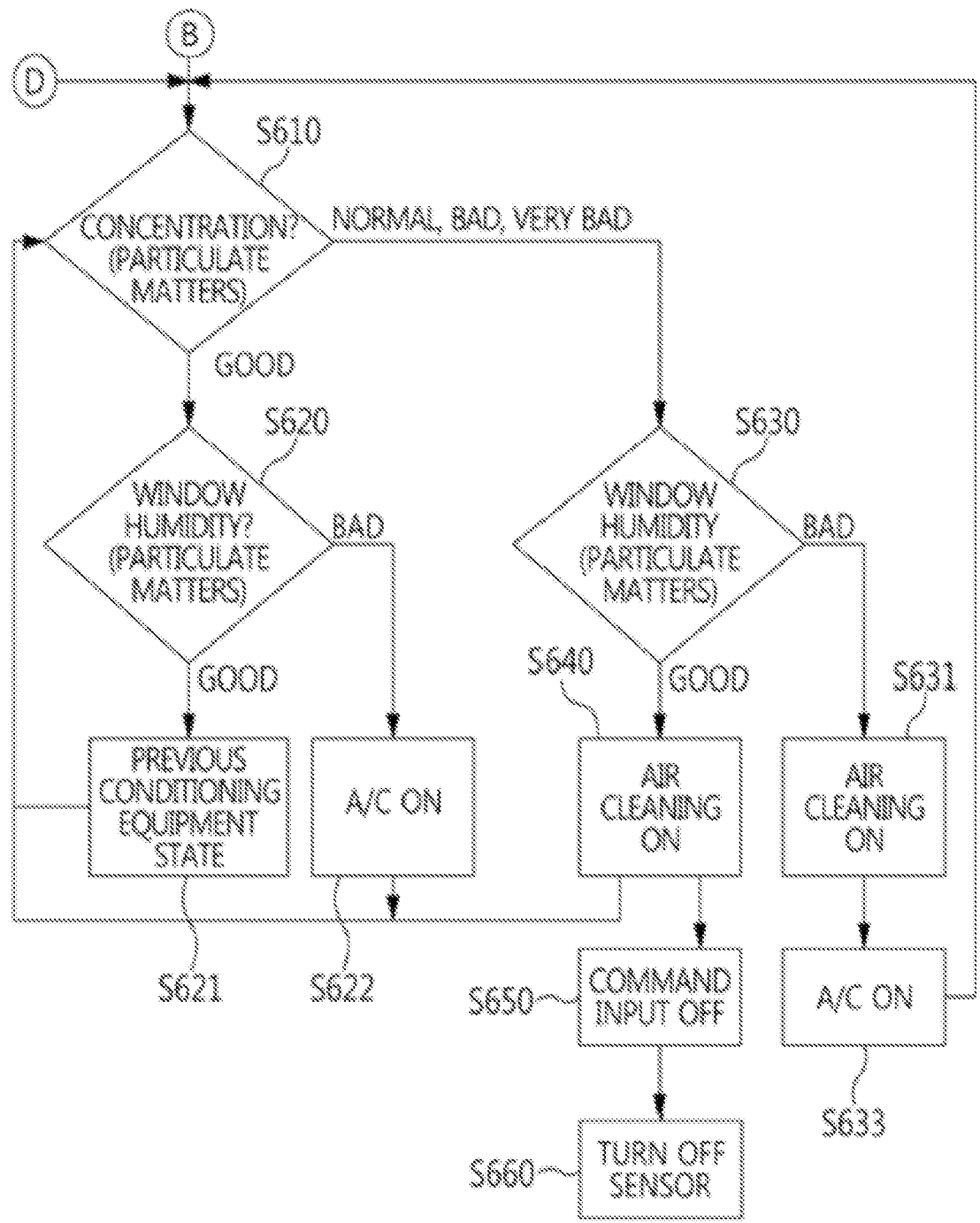
FIG. 6 is a flowchart showing a process of controlling an air conditioner shown in FIG. 4.

FIG. 6 is a flowchart showing a process of controlling an air conditioner shown in FIG. 4. Referring to FIG. 6, the air quality is measured using the sensor (130 in FIG. 1), and the air cleaning control is not operated when the indoor air is cleaned (that is, "good") (steps S610, S620, and S621). The contamination concentration can be graded. This may be represented as follows.

TABLE 1

| Division | Good | Normal | Bad | Very bad |
|---|---|---|---|---|
| Concentration(μm/m²) | 15 or less | 35 or less | 75 or less | 76 or more |

Of course, if the occurrence of window moisture is expected by using the auto defog sensor (ADS) among the sensors, the air conditioner (A/C) is turned on to lower the indoor humidity to prevent the window moisture (steps S630, S631, and S633).

Even if the window humidity occurs, the contamination concentration is "normal", and if the turn off command for the air cleaning control is input in the state where the air cleaning control is turned on, the sensor 130 is turned off (steps S630, S640, S650, and S660).

Of course, if the occurrence of window moisture is expected by using the auto defog sensor (ADS) among the sensors, the air conditioner (A/C) is turned on to lower the indoor humidity to prevent the window moisture (steps S620, S630, S631, and 633).

Even if the window humidity occurs, the contamination concentration is "good", and if the turn off command for the air cleaning control is input in the state where the air cleaning control is turned on, the sensor 130 is turned off (steps S630, S640, S650, and S660).

Therefore, when the air cleaning logic is operated, the indoor/outdoor unit control and the blower control are performed depending on the indoor contamination concentration in the vehicle. If necessary, the A/C is turned on to increase the fuel efficiency.

Figure 7A:
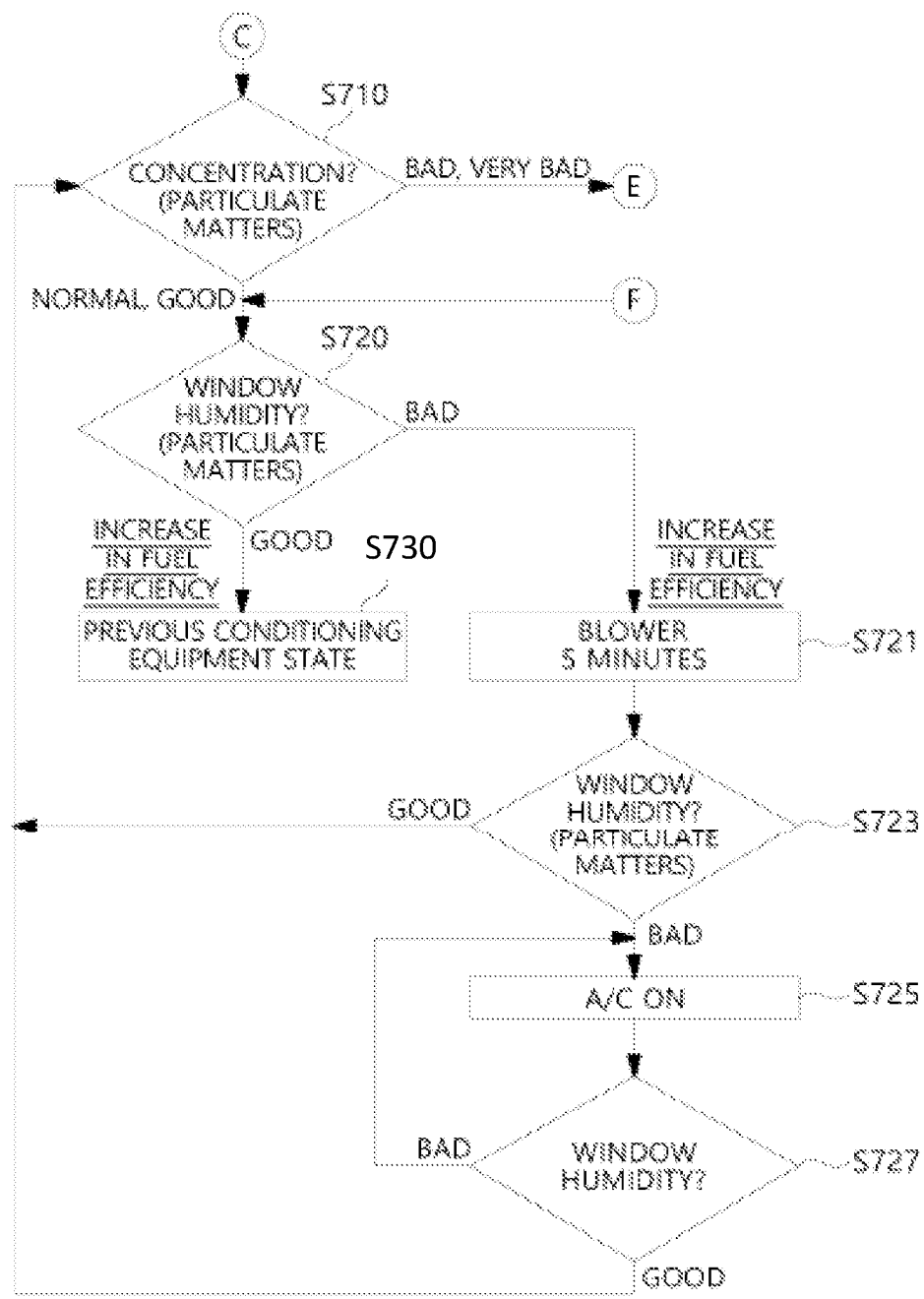
FIGS. 7A and 7B are flowcharts showing a process of controlling a blower and an air conditioner shown in FIG. 4.
Figure 7B:
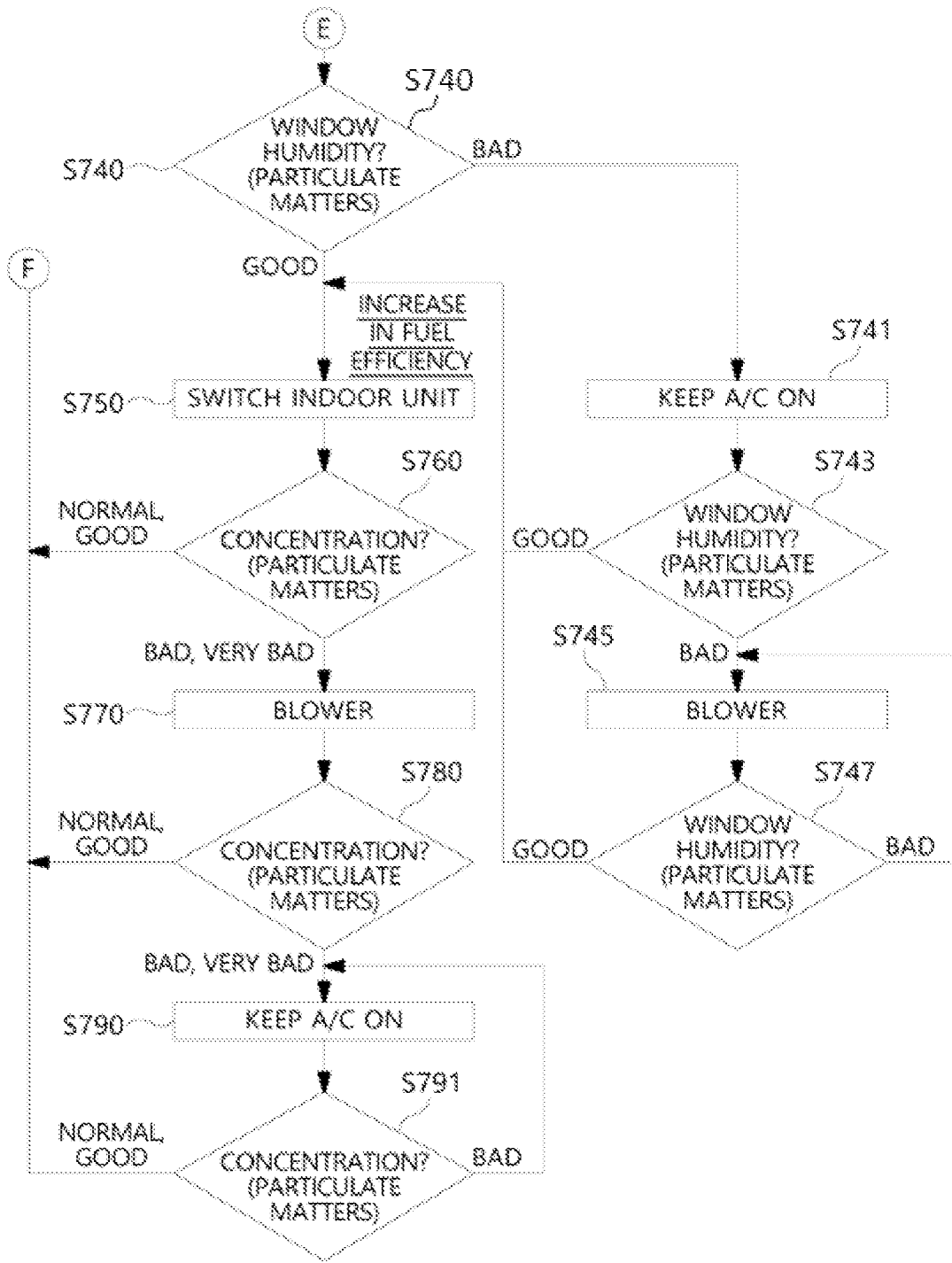

FIGS. 7A and 7B are flowcharts showing a process of controlling a blower and an air conditioner shown in FIG. 4. Referring to FIGS. 7A and 7B, the air quality is measured by using the sensor (130 in FIG. 1), and when the indoor air is cleaned (that is, "normal" or "good") and the auto defog sensor (ADS) is used to expect the occurrence of the window humidity, the air cleaning control is not operated (steps S710, S720, and S730). Of course, if the auto defog sensor (ADS) among the sensors is used to expect the occurrence of the window humidity, the blower is turned on for 5 minutes, if the window moisture is expected to occur, the A/C is turned on, and if the window moisture is not expected to occur, the process proceeds to step S710 (S721, S723, S725, and S727).

When the indoor air is not good ("bad", "very bad") in step S710, the A/C keeps the turn on state if the window moisture is expected to occur. Thereafter, if the window humidity is expected to occur, the blower is turned on and if the window humidity is not expected to occur again after the blower is turned on, the process proceeds to step S750 (steps S740, S741, S743, S745, and S747).

In step S740, if the window moisture is not expected, the indoor unit switching is performed, and if the indoor air is still bad ("bad", "very bad"), the blower is turned on. After the blower is turned on, if the indoor air is bad again, the A/C is kept to be in the turned on state, and if the indoor air is good again, the process proceeds to step S720 (steps S750, S760, S770, S780, S790, and S791).

In addition, the steps of the method or the algorithm described in some forms of the present disclosure proposed herein may be directly implemented in a program command form that may be executed by various computer means such as a microprocessor, a processor, and a central processing unit (CPU) to be recorded in a computer-readable medium. The computer readable medium may include a program (instruction) code, a data file, a data structure, or the like, alone or a combination thereof.

The program (instruction) code recorded in the computer-readable recording medium may be designed and constituted especially for the present disclosure, or may be known to those skilled in a field of computer software. Examples of the computer-readable recording medium may include magnetic media such as a hard disk, a floppy disk and a magnetic tape, optical media such as CD-ROM, DVD, Blu-ray and the like, and semiconductor storage elements such as ROM, RAM, flash memory, and the like, for example, specifically configured to store and execute the program (instruction) code.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for cleaning air within a vehicle, comprising:
    a conditioning equipment including a blower and an air conditioner;
    an input unit configured to receive an air cleaning command from a user that operates the conditioning equipment; and
    a controller including a processor configured to:
        execute an air cleaning control including control of at least one of the blower and the air conditioner corresponding to the air cleaning command,
        progressively control the blower depending on a particulate or gas contamination concentration of indoor air within the vehicle, and
        turn on the air conditioner of the conditioning equipment, regardless of an activation or deactivation of the blower corresponding to the air cleaning command received from the user, only when occurrence of moisture on a surface of a window of the vehicle is expected.

2. The apparatus of claim 1, wherein the controller is configured to:
    release the air cleaning control in response to an open/close state of an opening/closing device of the vehicle.

3. The apparatus of claim 2, wherein the controller is configured to:
    close the opening/closing device when the air cleaning command is input; and
    release the air cleaning control after a preset waiting time lapses when the opening/closing device is open.

4. The apparatus of claim 1, wherein the apparatus further comprises:
    a sensor configured to measure the contamination concentration in the vehicle.

5. The apparatus of claim 4, wherein the controller is configured to:
    perform an outdoor air mode that circulates air outside the vehicle by using the conditioning equipment depending on the contamination concentration; and
    perform an indoor air mode that circulates only air inside the vehicle.

6. The apparatus of claim 4, wherein the controller is configured to:
    activate the air conditioner of the conditioning equipment only when the sensor detects humidity on a window of the vehicle greater than or equal to a preset reference value.

7. The apparatus of claim 4, wherein the contamination concentration is converted into a grade.

8. The apparatus of claim 4, wherein the contamination concentration is converted into a concentration level.

9. The apparatus of claim 4, wherein the apparatus further comprises:
    an output unit configured to output the contamination concentration.

10. A method for cleaning air comprising:
    receiving, from a user by an input unit, an air cleaning command that operates a conditioning equipment including a blower and an air conditioner; and
    executing, by a controller including a processor, an air cleaning control including control of at least one of the blower and the air conditioner corresponding to the air cleaning command;
    wherein the controller progressively controls the blower depending on a particulate or gas contamination concentration of indoor air within the vehicle, and
    wherein the controller turns on the air conditioner of the conditioning equipment, regardless of an activation or deactivation of the blower corresponding to the air cleaning command received from the user, only when occurrence of window moisture is expected.

11. The method of claim 10, wherein the method comprises:
    releasing, by the controller, the air cleaning control in response to an open/close state of an opening/closing device of the vehicle.

12. The method of claim 11, wherein the method comprises:
    closing, by the controller, the opening/closing device when the air cleaning command is input; and
    when the opening/closing device is open, releasing, by the controller, the air cleaning control after a preset waiting time lapses.

13. The method of claim 10, wherein the method further comprises:
    measuring, by a sensor, a contamination concentration in a vehicle.

14. The method of claim 13, wherein the method comprises:
    performing, by the controller, an outdoor air mode that circulates air outside the vehicle by using the conditioning equipment depending on the contamination concentration; and
    performing, by the controller, an indoor air mode that circulates only air inside the vehicle.

15. The method of claim 13, wherein the method comprises:
   activating, by the controller, the air conditioner of the conditioning equipment only after the sensor detects humidity on a window of the vehicle that is greater than or equal to a preset reference value.

16. The method of claim 13, wherein the contamination concentration is converted into a grade.

17. The method of claim 13, wherein the contamination concentration is converted into a concentration level.

* * * * *